United States Patent [19]

Lloyd et al.

[11] Patent Number: 5,066,638
[45] Date of Patent: Nov. 19, 1991

[54] SUPERCONDUCTING MOTOR WITH MULTIPLE WINDING ROTOR

[75] Inventors: Jerry D. Lloyd, St. Louis, Mo.; M. A. Hilal, Madison, Wis.

[73] Assignee: Emerson Electric Co., St. Louis, Mo.

[21] Appl. No.: 579,863

[22] Filed: Sep. 10, 1990

[51] Int. Cl.$^5$ .................. H01B 12/12; H02K 55/04
[52] U.S. Cl. ........................................ 505/1; 505/700; 505/876; 505/877; 310/198; 310/68 R; 310/162; 310/261; 310/208
[58] Field of Search .................. 310/208, 10, 40.5, 52, 310/206, 198, 68 R, 68 B, 162, 261; 335/216; 505/1, 700, 852, 775, 876, 877, 884

[56] References Cited

U.S. PATENT DOCUMENTS 3,999,091 12/1976 Kirtley, Jr. et al. .................. 310/52
4,583,014 4/1986 Murphy, Sr. et al. ................ 310/52
4,885,494 12/1989 Higashi ............................... 310/211

Primary Examiner—Steven L. Stephan
Assistant Examiner—Edward H. To
Attorney, Agent, or Firm—Polster, Polster and Lucchesi

[57] ABSTRACT

A superconducting motor (1) comprises a stator (3) and a rotor (5), both of which employ superconductive windings. The rotor includes two sets of windings, a large rotor winding (13) and a small rotor winding (15). The windings are connected to form a current loop (16) which is exposed to a magnetic field. Switches (S1,S2) or diodes (D1,D2) are employed to trap a maximum number of magnetic flux lines in the loop when the magnetic field is impressed on the loop. Thereafter, the trapped flux is transferred from the small to the large winding to run the motor. When the switches are closed, the loop acts as a perfect conductor whereby no flux change occurs within the loop.

18 Claims, 3 Drawing Sheets

5,066,638

SUPERCONDUCTING MOTOR WITH MULTIPLE WINDING ROTOR

BACKGROUND OF THE INVENTION

This invention relates to self-energized, air-core (SEAC) superconducting motors and more particularly, to such a motor having a multiple winding rotor.

The discovery of high-temperature superconductors (HTS) is expected to greatly impact the design, specific power and efficiency of electric motors. First, high specific power motors can now be designed in which the magnetic materials previously used are eliminated. In such motors, high magnetic fields can be more efficiently generated using superconductive windings. Second, use of HTS materials will significantly reduce winding losses and other eddy current losses. Further, hystersis losses in the magnetic material are also eliminated. Generally, the new design superconducting motors should achieve efficiencies exceeding 95% (for intermediate size motors) compared with the 90% efficiency of conventional motors. The motors are useful in various propulsion system applications.

Conventional synchronous and induction motors are used, for example, as intermediate size motor drives. Generally, the design of these motors is inappropriate for superconducting motors since these designs cannot fully realize the unique properties of superconducting materials. Replacing rotor windings of a conventional three-phase induction motor with a superconducting winding, for example, is not adequate. If the rotor winding has a cross-sectional area large enough to carry induced current without going into normal (steady state) operation, it will produce zero (0) average torque. But, if the rotor winding has a smaller cross-sectional area, it may be driven into its normal operating state in a non-controllable manner during start-up. Use of a three-phase synchronous motor does not create these problems; and, elimination of brushes in such a motor has particular advantages in high speed applications. The motor of this invention operates as a synchronous motor when it reaches steady state operating condition, while the rotor windings are inductively energized and controlled in operation as described hereinafter.

SUMMARY OF THE INVENTION

Among the several objects of the present invention may be noted the provision of a poly-phase synchronous motor; the provision of such a motor which is a self-energizing, air-core motor; the provision of such a motor to have a multiple-winding rotor; the provision of such a motor in which a magnetic field is impressed on a rotor circuit including the windings with a maximum amount of magnetic flux being enclosed in the rotor circuit; the provision of such a motor to include active or passive switches to enclose the magnetic flux in the rotor circuit; the provision of such a motor to utilize superconductive materials and particularly high energy superconductive materials; and, the provision of such a motor which is compact and useful in propulsion systems and similar applications. The invention, briefly stated, is directed to a motor comprising a stator and a rotor. The rotor includes at least two sets of windings, a large rotor winding and a small rotor winding. The windings are interconnected to form a current loop which is exposed to a magnetic field. A switch is provided for trapping a maximum number of magnetic flux lines in the small loop when the magnetic field is impressed on it. The trapped flux is thereafter transferred from the small to the large winding to run the motor. The loop acts as a perfect conductor whereby no flux change occurs within the loop. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
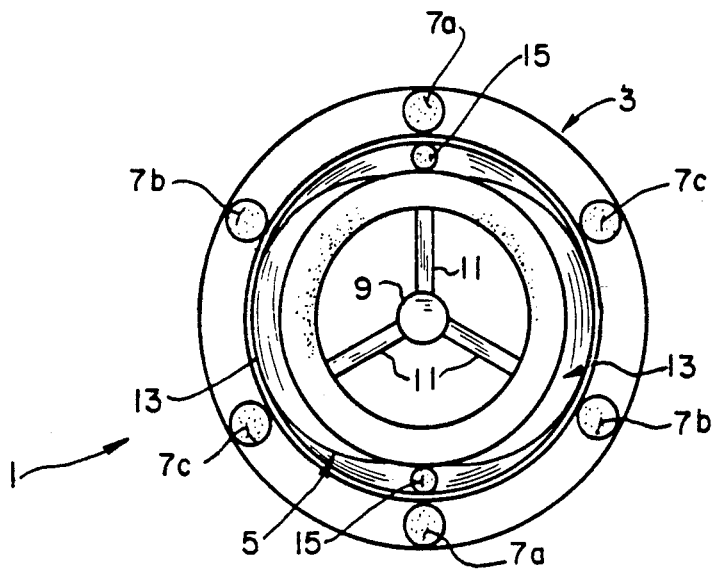
FIG. 1 is a cross-sectional view of a motor of the present invention.

Referring to the drawings, one illustrative embodiment of a motor of the present invention is indicated generally by the reference numeral 1. The motor is a self-energizing, air-core (SEAC) type motor. It is also a multi-phase or poly-phase synchronous motor having a stator assembly 3 and a rotor assembly 5. The stator assembly includes a three-phase stator having winding sets 7a, 7b and 7c respectively. The winding sets are physically installed around the circumference of the stator assembly so the phases represented by each set of windings are 120 degrees apart electrically.

The rotor assembly includes a rotatable shaft 9 attached to the rotor assembly by radially inwardly extending arms 11. It further includes a first and large winding 13 and a second and smaller winding 15. The windings are installed in the rotor assembly so their axes are normal or orthogonal to each other. While shown in FIG. 1 as a single set of windings, it will be understood that the small rotor winding can be implemented by multiple sets of small windings; for example, the three sets of windings 15a–15c shown in FIG. 6. The small rotor winding could include several sets of such windings. Further, the turns ratio of the number of turns in the large winding compared to that in the small winding is between 5:1 and 10:1. Winding 13, for example, may have 100 turns, while winding 15 may have 10 turns. Or, winding 13 may have 200 turns, while winding 15 may comprise eight sets of windings each having 5 turns. The windings comprising both the stator and rotor windings are made of a superconductive material which is preferably a high temperature (HTS) superconductive material. Such material offers little or no resistance to flow of current through it.

Figure 2:
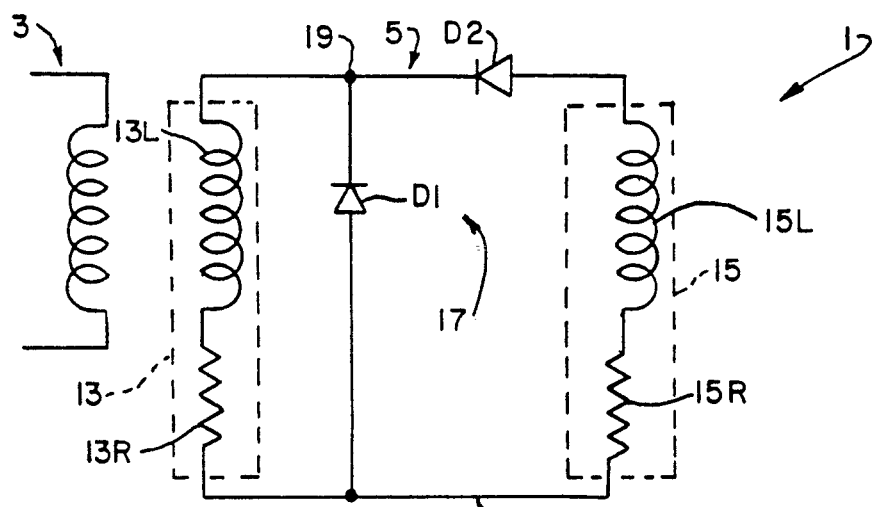
FIG. 2 is a schematic of a first embodiment of a rotor assembly of the motor.
Figure 3:
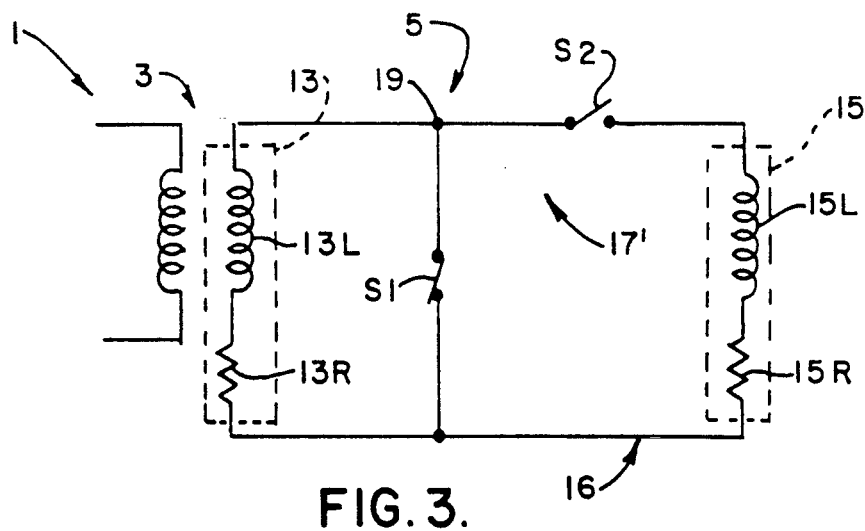
FIG. 3 is a schematic of a second embodiment thereof.
Figure 6:
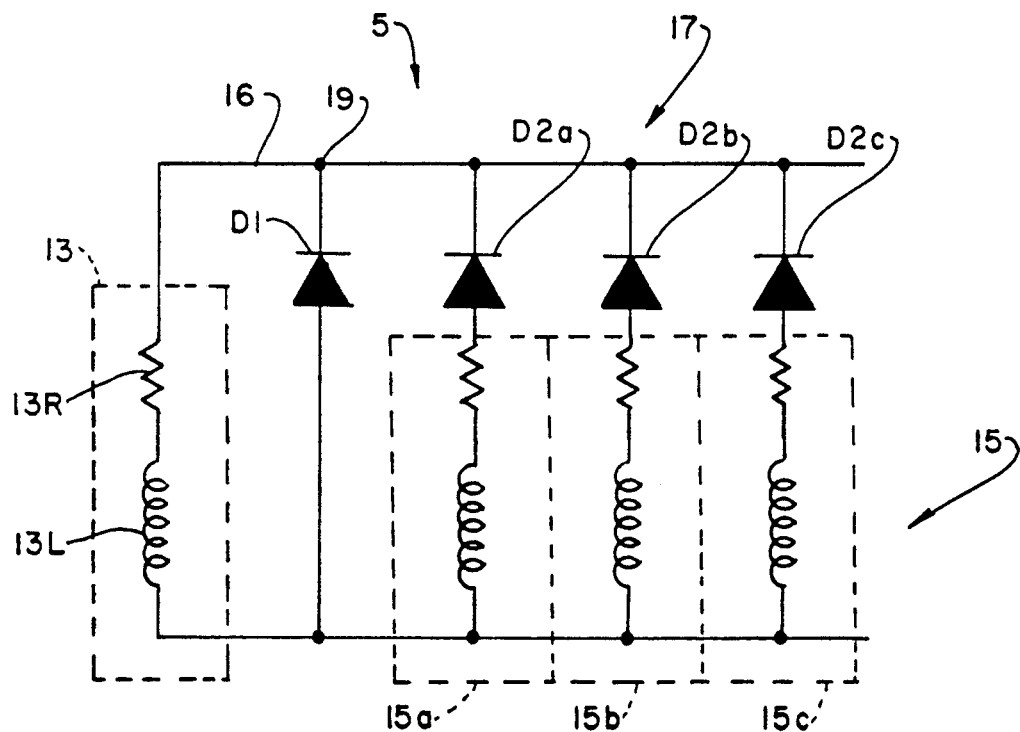
FIG. 6 is a schematic of a rotor having multiple sets of windings comprising the small rotor winding.

Referring to FIGS. 2 and 3, windings 13 and 15 are connected to form the current loops or circuit 16 which is exposed to a magnetic field in the motor. As represented therein, each winding includes both its inductive or reactance component (13L or 15L respectively) and its resistive component (13R or 15R respectively). Further, means indicated generally 17 (see FIG. 2) or 17' (see FIG. 3) is provided with the motor. Means 17 and 17' are for trapping a maximum number of magnetic flux lines in loop 16 when the magnetic field is impressed on the loop. Thereafter, the flux is transferred between the windings during portions of the magnetic field's cycle. As shown in FIG. 2, means 17 includes a pair of diodes D1 and D2 respectively. Diode D1 is connected in parallel with the windings while diode D2 is connected in series with the small winding. The interconnection is such that the cathode of diode D1 is connected to the same node 19 in loop 16 as the cathode of diode D2. Referring to FIG. 6, where winding 15 includes a number of sets 15a-15c of windings, means 17 includes diodes D2a-D2c, each of which is series connected with its associated winding set. The respective winding sets and their associated diodes are connected in parallel. Additional winding sets of winding 15 are similarly connected.

Alternatively, as shown in FIG. 3, means 17' includes a pair of switches S1 and S2 respectively. Switch S1 is connected in parallel with the windings; while switch S2 is connected in series with the small windings.

Figure 4A:
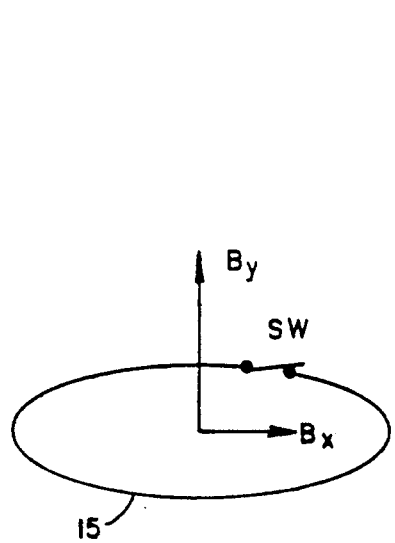
FIGS. 4a, 4b, and 4c illustrate one cycle of flux pumping in a rotor loop.
Figure 4B:
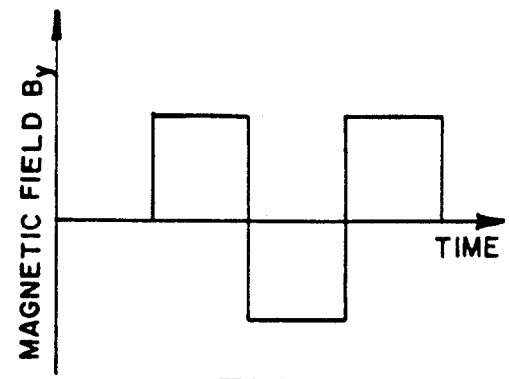
Figure 4C:
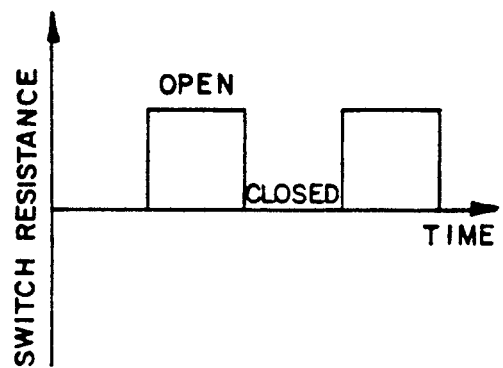
Figures 5A, 5B:
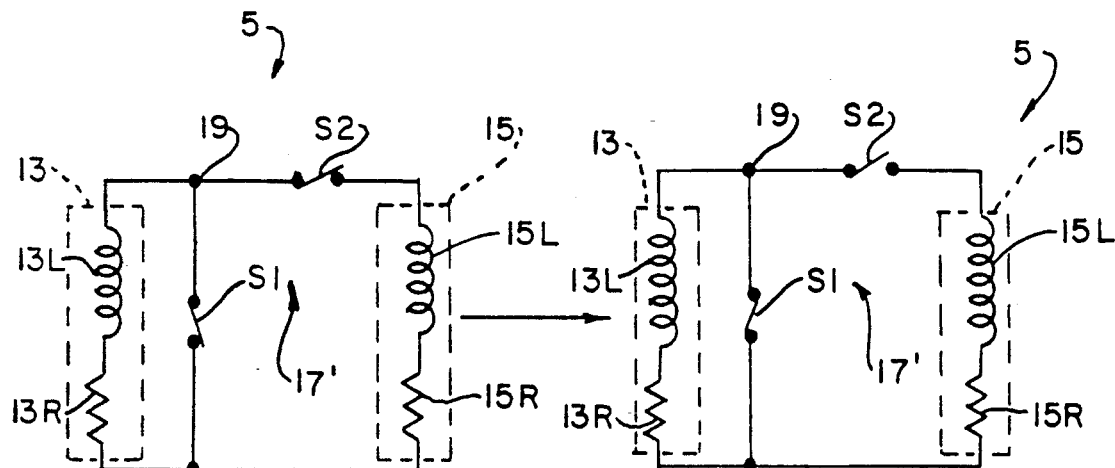
FIGS. 5a–5d represent one sequence of motor operations.

Referring to FIGS. 4 and 5, motor 1 is intended to operate as a conventional electric motor from the standpoint that power is supplied to the stator of the motor. Application of power, for example, single phase, 115 volt phase, or three phase (used for illustration here), electrically energizes the stator windings to create a rotating, magnetic field. As noted, the axes of windings 13 and 15 are normal to each other. Rotor 5 is initially stationary and windings 13 and 15 are exposed to the rotating, magnetic field provided by the stator. In this condition, both switches S1 and S2, as shown in FIG. 5a, are closed. As the magnetic field rotates to a point 180 degrees from parallel with the axes of winding 15, switch S2 opens (see FIG. 5b).

As shown in FIGS. 4a, winding 15 is exposed to the magnetic field B which has normal and orthogonal components (Bx and By). Rotation of the magnetic field produces a cyclical, square-wave type impulse (FIG. 4b) to which winding 15 is subjected. If a switch SW has characteristics similar to those shown in FIG. 4c, it will, when open, allow the magnetic flux lines associated with the field to penetrate the winding. This is known as "flux pumping" and, in effect, charges the winding. When the switch is closed, it encloses a maximum number of flux lines.

Figures 5C, 5D:
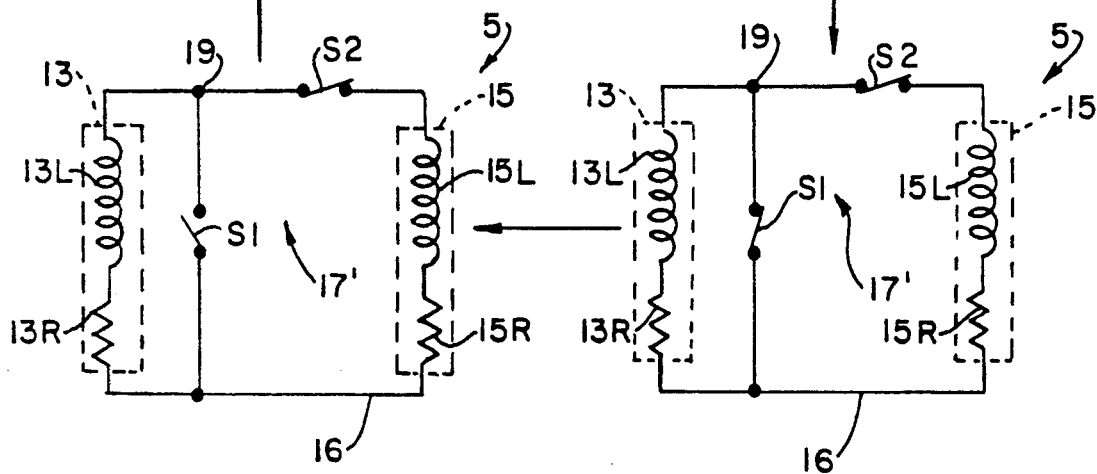

With respect to motor 1, switch SW corresponds to switch S2. Thus, as shown in FIG. 5b, as the magnetic field rotates 180 degrees from being parallel to the axis of winding 15, switch S2 opens and the winding is penetrated by magnetic flux. As the magnetic field continues its rotation, switch S2 closes (FIG. 5c) and the flux is trapped in the winding. As the magnetic field continues to rotate switch S1 is opened (FIG. 5d). This connects windings 13 and 15 in series. Flux trapped in winding 15 is partially transferred to winding 13, charging the winding and accelerating rotor 5. Because the rotor windings are of a superconductive material, and because switch resistance is very small, the loop acts a perfect or lossless conductor. Finally, switch S1 closes (FIG. 5a) and the cycle repeats itself until the rotor reaches the angular velocity of the magnetic field. When this steady state condition is achieved, the rotor synchronously rotates with the field.

As noted, both the stator and rotor employ superconductive materials. Besides permitting loop 16 to act as a perfect conductor, use of these materials permit continued operation of the rotor windings after a steady state condition is reached. Current decay will not occur in the loop since this will automatically cause "flux pumping" and recharge of the windings. Further, the windings can operate in very intense magnetic fields. This eliminates the need to use iron laminations to magnetically link the stator and rotor windings. An efficient dipole type winding can thus be used in air-core motors such as motor 1 to increase their specific power.

While the above described operation is with respect to the use of switches in the rotor, the use of diodes such as shown in FIGS. 2 and 6 is also attractive. This is because the switching operation is fully passive. With respect to FIG. 2, "flux pumping" or charging of winding 15 takes place when diode D2 is in its non-conducting state. Thereafter, the sequence is similar to that previously described in which the changing conductive states of the diodes allow the large and small windings to be connected in series for the flux captured in winding 15 to b ®transferred to Winding 13 to accelerate the rotor.

Having thus described the invention, what is claimed and desired to be secured by Letters Patent is:

1. A motor comprising:
    a stator;
    a rotor including at least two sets of windings, a large rotor winding and a small rotor winding, said windings being connected to form a current loop which is exposed to a magnetic field; and,
    means for trapping a maximum number of magnetic flux lines in the loop when the magnetic field is impressed on the loop and for thereafter transferring the trapped flux between the large and small windings to run the motor, the loop acting as a perfect conductor whereby no flux change occurs within the loop after the flux lines are trapped.

2. The motor of claim 1 which is a self-energizing, air-core motor.

3. The motor of claim 2 wherein the rotor and stator are each made from superconductive materials.

4. The motor of claim 3 wherein the rotor and stator are each made from a high temperature (HTS) superconductive material.

5. The motor of claim 1 in which the large and small rotor windings are installed so their axes are orthogonal to each other.

6. The motor of claim 5 wherein the flux trapping means includes a pair of switches one of which is connected in series with the large and small windings and the other of which is connected in parallel therebetween.

7. The motor of claim 6 wherein the switches are passive switches.

8. The motor of claim 7 wherein the passive switches are diodes.

9. The motor of claim 1 which is a poly-phase motor.

10. The motor of claim 9 which is a three-phase synchronous motor.

11. The motor of claim 10 wherein the stator includes three sets of electrical windings spaced 120 degrees apart electrically.

12. The motor of claim 1 wherein the turns ratio of the large winding to that of the small winding is between 5:1 and 10:1.

13. The motor of claim 12 wherein the small winding is comprised of a plurality of sets of windings.

14. A poly-phase, self-energizing, air-core motor comprising:
    a stator having three sets of windings;

a rotor including a large rotor winding and a small rotor winding, said windings being installed so their axes are orthogonal to each other and connected to form a current loop which is exposed to a magnetic field, said stator and rotor each being made from a superconductive material, and the ratio of turns of the large winding to the small winding being between 5:1 and 10:1; and, means for trapping a maximum number of magnetic flux lines in the loop when the magnetic field is impressed thereon and for thereafter transferring the trapped flux between the large and small winding to run the motor, the loop acting as a perfect conductor whereby no flux change occurs within the loop after the flux lines are trapped.

15. The motor of claim 14 wherein the flux trapping means includes a pair of switches one of which is connected in series between the large and small windings and the other of which is connected in parallel therebetween.

16. The motor of claim 15 in which the switches are passive switches.

17. The motor of claim 16 wherein the passive switches are diodes.

18. The motor of claim 14 wherein the small rotor winding is comprised of a plurality of sets of windings.

* * * * *